United States Patent Office 2,703,995
Patented Mar. 15, 1955

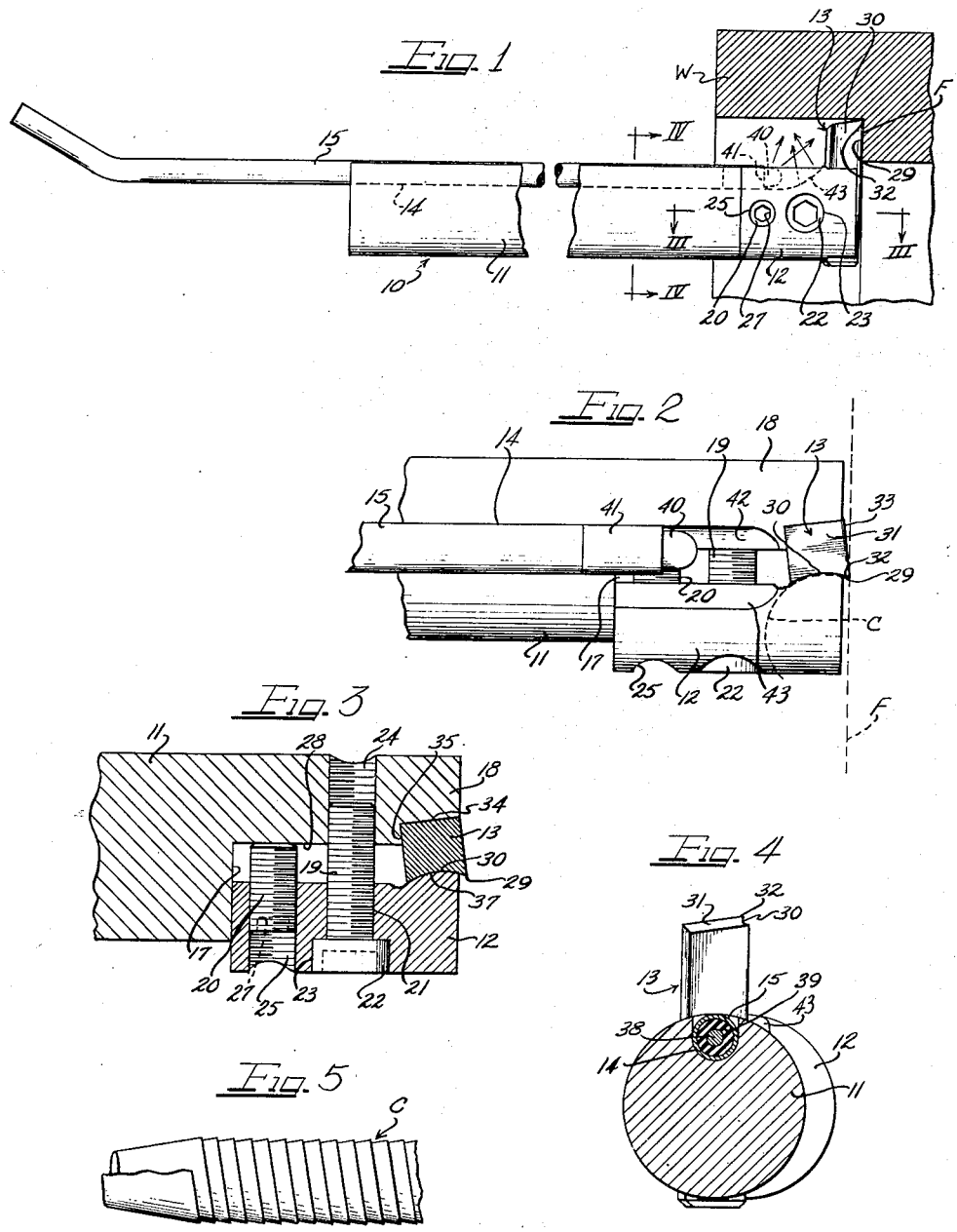

2,703,995

CUTTING TOOL, INCLUDING BORING BARS AND THE LIKE

Waldo L. Garberding, Chicago, Ill.

Application August 24, 1948, Serial No. 45,907

8 Claims. (Cl. 77—58)

The present invention relates to improvements in cutting tools and more especially relates to cutting tools adapted to be utilized in the cutting of metal, such as boring bars and the like.

In the use of cutting tools of the type where a hardened cutting bit is supported by a holder comprising a bar or arm a number of important problems arise. Among these problems is that of obtaining a high rate of production while maintaining a high standard of quality. This depends very largely upon the character of the cutting bit, that is, the manner in which it is ground, the size and depth of cut for which the bit may be relied upon, the frequency with which the bit requires sharpening and the degree of skill with which it must be ground. Of further importance is the manner in which the bit is supported during operation by the supporting bar or holder. If the bar or holder tends to vibrate at the full cutting efficiency of the bit, the potential rate of production of the bit is not taken advantage of since chatter marks will appear in the finished work. Moreover, where, especially in the use of boring bars, but also in lathe work on external surfaces, inspection of the work as the cutting operation proceeds is desirable and perhaps even essential, much time is lost where it is necessary to stop the machine or at least withdraw the tool for inspection purposes, or where dull lighting renders it difficult to observe the worked surface adequately without the nuisance of manipulating a lamp adjacent to the work.

An important object of the present invention is to provide an improved cutting tool assembly of substantially increased efficiency.

Another object of the invention is to provide an improved cutting tool assembly which is adapted for substantially improved cutting rates while using tool parts made from the customary materials, that is, without requiring a tool bit of greater hardness than ordinarily used for similar work at lower production rates, or a tool holder of any higher grade material than customarily used.

Still another object of the invention is to provide a cutting tool assembly of substantially improved efficiency and which is nevertheless usable in the standard supporting fixtures.

Yet another object of the invention is to provide an improved tool bit which is of an exceptionally high cutting efficiency, but is extremely simple to grind for resharpening and has an exceptionally long useful life, enabling a large number of grindings for sharpening purposes.

A further object of the invention is to provide an improved tool holding bar or arm construction which enables heavier cuts to be taken without objectionable vibrations or chattering.

A still further object of the invention is to provide an improved self-illuminating cutting tool assembly.

Other objects, features and advantages of the present invention will be readily apparent from the following detailed description of a preferred embodiment thereof taken in conjunction with the accompanying drawings in which:

Figure 1 is a fragmental elevational view of a cutting tool embodying the features of the present invention and showing the same as it appears in operation;

Figure 2 is a fragmentary top plan view of the cutting bit end portion of the cutting tool assembly;

Figure 3 is a fragmentary sectional view taken substantially on the line III—III of Figure 1;

Figure 4 is a transverse sectional elevational view taken substantially on the line IV—IV of Figure 1; and Figure 5 is a fragmentary elevational view of a curled chip as produced by the tool of the present invention during operation.

Although it will be obvious as the description proceeds that the present invention is applicable to other cutting tool assemblies such as lathe tools and the like, it is shown herein by way of illustration as embodied in a boring bar assembly 10 of a type which is found to possess high practical merit. This assembly includes a boring bar 11 having at the head end thereof a clamping block 12 by which a cutting bit 13 is supported, the bar having a longitudinal groove 14 therein within which is supported a lamp rod or stem 15.

The bar or tool holder 11 is preferably of the conventional cylindrical solid form and is of any preferred length depending upon its size or the nature of its use, and may conform to more or less standard sizes, being formed of the preferred solid steel stock.

The clamping block 12 may comprise a separately formed piece or it may be formed by cutting out a segment such as a semi-cylindrical portion of the head end of the bar 11. In any event, the clamping block 12 is accommodated within a reentrant or angular cut-out 17 in the head end of the bar. The length of the clamping block 12 and the accommodating recess 17 is preferably such that the cutting bit 13 is adapted to be engaged between the forward end of the block 11 and the forward extremity portion of the bar 12 which comprises a tool holding head 18, while rearwardly from the tool a clamping screw 19 and a set screw 20 are accommodated in appropriately mutually spaced relation. The clamping screw 19 extends freely slidably through a preferably central bore 21 in the clamping block 11 and has a recessed socket head 22 received within the outer face of the block countersunk within a counterbore 23. A threaded bore 24 through the tool head 18 registers with the clamping block bore 21 and receives the shank of the clamping screw 19 threadedly for drawing the clamping block 12 into clamping engagement with the tool or cutting bit 13. The set screw 20 is threaded into an appropriate threaded bore 25 in the rear portion of the clamping block 12 and is provided with a hexagonal wrench socket 27 for engagement by a wrench which is driven against a longitudinal bottoming face 28 defining the longitudinal side of the recess 17.

The tool bit 13 is of a highly improved form which is exceedingly simple to sharpen and maintain in sharpened condition, that is, can be very easily ground by even relatively inexperienced persons after simple instructions and is of exceedingly high efficiency. It comprises simply a bar of hardened tool steel of initially generally rectangular cross-section and of appropriate size. At one longitudinal corner of the bit a cutting edge 29 is provided by grinding a longitudinal face 30 of the bit on a concave radius. By preference the entire face 30 is ground on the preferred radius and thus provides a smooth large radius chip track along which a chip of material cut from the work piece slides easily clear of the work. In a practical structure it has been found a bit having an initially quarter inch square cross section, a one quarter inch radius in the face 30 is quite satisfactory. At its cutting tip end, the end surface of the bit identified at 31 is relieved by grinding the same back on a taper from the tip of the tool identified at 32. At its outer corner, that is, the straight corner edge which merges with the tip 32, the bit is preferably ground down slightly to break the edge of the corner, substantially as shown at 33. This has been found to improve the operation of the tool.

In mounting the cutting bit 13 it is disposed with the longitudinal cutting edge 29 directed forwardly and toward one side of the supporting bar 11 and preferably in a position where it projects forwardly beyond the tip of the head 18 and the forward tip of the clamping block 12 so as to approach as closely as practicable to a blind end within a bore. Furthermore, the tool is tilted slightly so that the tip 32 is projected forwardly slightly more than the heel of the tip. A forward tilt of about two degrees has been found satisfactory. To this end, the forward portion of the tool carrying head 18 of the bar is formed at the clamping recessed side thereof with a tool bit socket 34 within which the squared longitudinal back face of the bit is seated snugly in proper relation to the tip of the holder and with the inside face thereof backed up by a shoulder 35. In order to accommodate the two degree outward tilt of the cutting tip of the bit, the socket 34 is formed with the appropriate two degree bias in its longitudinal direction. Furthermore, the bit socket 34 is formed on a preferred bias in a transverse direction to angle cutting edge of the tool out from the tip of the holder to proper cutting angle. In practice an angle of approximately seven degrees has been found satisfactory. With the bit 13 properly positioned in the socket 34 and with an adequate clearance between the cutting tip and the supporting bar for the width of cut to be taken, the bit is clamped firmly in the socket 34 by the clamping block 12 which is preferably formed with a forward clamping finger 37 formed on a radius complementary to the radius of the face 30 of the bit so as to afford a thorough, tight engagement with the radiused face of the bit throughout the portion thereof which opposes the clamping block and which in practice comprises a major extent of the length of the bit. When the clamping screw 19 has drawn the clamping block 12 tight against the bit, and the set screw 20 has been tightened to prevent the clamping block 12 from being tilted away from the bit 13, the bit is held firmly for cutting purposes, the shoulder 35 and the radiused profile clamping nose or finger 37 of the clamping block firmly holding the cutting bit 13 against tilting about a transverse axis in operation.

Ample clearance for take-up to two-thirds of the thickness of the cutting bit 13 is provided for between the clamping block 12 and the opposing recessed face 28 so that the bit 13 can be resharpened a large number of times and its life thus prolonged. The use of the bit throughout such a long life is also facilitated by having it clamped in the tip of the holder bar 11 in such a manner that the longitudinal corner opposite and at the same side of the tool bit bar as the cutting edge 29 but at the back of the tool bit is approximately flush with or even projects somewhat from the tip of the clamping head 18 in the clamped condition of the bit, substantially as shown in Figures 2 and 3.

Sharpening of the bit is accomplished without exercise of any special skill by merely grinding down the profiled face 30 while maintaining the same radius. Thus, all that need be done is to place the bit in a fixture or magnetic chuck, or the like and grind the profiled face 30 down to the necessary amount by means of a properly profiled grinding wheel. This requires no special exercise of judgment as to angle of grind, so that even a beginning apprentice can grind the bit accurately, either in the first instance or for resharpening.

In operation, the bit 13 is capable of taking an unusually wide and heavy cut smoothly and efficiently in a work piece W. As the bit is carried by the bar 11 in a suitable holder (not shown) against the face F of the material to be removed from the work piece and the work piece rotated in contact with the bit as is the usual practice, the material or chip cut from the face F curls smoothly on the radius of the profiled chip face 30, substantially as indicated at C in Figure 2. Instead of a rough, scraggly chip as produced by conventional bits, the resulting chip comes off as tight, uniform helical curls of a length permitted by the working clearances encountered. Illustration of a fragment of an actual chip is shown in Figure 5. Throughout its major extent the chip C is of substantially uniform, cylindrical shape both interiorly and externally and is so tight and uniformly compact that it feels practically solid when handled.

An important contribution in attaining a high speed production has been found to reside in having the longitudinal groove 14 in the boring bar 11. Whereas without the groove 14, the boring bar tends to vibrate and cause chatter of the cutting bit against the work where a heavy cut is taken, especially, it has been found that by having the groove 14 longitudinally in the bar 11, the vibrational harmonic is dissipated and the bar yields resiliently without vibration which would result in chatter and thus chatter marks on the work. As a result the tool bit can be caused to cut unusually heavily with unexpected smoothness and freedom from chatter. A groove of rounded cross-section has been found to give best results.

The depth of the groove 14 may be varied and yet afford excellent anti-vibration results, but in the present instance it is preferably of ample depth to accommodate the lamp stem 15 therein without interference by the lamp stem with clamping of the bar 11 in a holder. As shown in Figure 4, the lamp stem 15 comprises a tubular outer casing within which is housed an electrical conductor 38 enclosed within a dielectrical material such as rubber or the like 39, the conductor 38 and the casing of the lamp stem 15 providing electrical circuit conductors for a small electrical lamp 40 carried at the tip of the lamp stem, the lamp being carried by a base 41 of no greater diameter than the stem 15 and adapted to be removably attached in a preferred fashion onto the tip of the stem. The lamp stem 15 is preferably of a greater length than the bar 11 and is adapted to be connected at its rear end with a suitable source of low voltage electricity for supplying the lamp 40. In assembly the lamp 40 is disposed as closely adjacent to the cutting bit 13 as is practicable, and the end of the groove 14 is preferably formed with a forward end 42 formed on a radius from the bottom of the groove toward the adjacent side of the head 18 of the bar to afford a reflecting surface, cooperating with a complementary groove surface 43 in the clamping block 12 so that light from the lamp 40 will be reflected effectively toward the opposing surface of the work substantially as indicated by the arrows in Figure 1. As shown, the groove 14 is preferably formed in line with the bit 13 so that the lamp 40 can be placed in the most efficient position relative to the bit. By having the lamp arranged as disclosed, concentrated illumination is had on the work in the immediate area where the cutting takes place and inspection of the progress is greatly facilitated.

In practice, I have found that the boring bar 11 as disclosed herein functions equally well as to its anti-chatter characteristics with or without the lamp stem 15 in the groove 14. The stem 15 is but a thin wall tube, as shown, and of relatively small diameter as compared to the diameter of the bar 11 and is therefore quite flexible compared to the bar. Therefore the tubular stem 15 can flex freely with the bar and offers no impairment of flexing of the bar in the anti-chatter functioning thereof, although the stem 15 lies operatively closely within the groove 14. As pointed out hereinabove, the groove 14 dissipates vibrational harmonic in operation of the bar 11; and this does not appear to be affected one way or the other whether the lamp stem 15 is in the groove or not.

It will be understood that modifications and variations may be effected without departing from the scope of the novel concepts of the present invention.

I claim as my invention:

1. In combination in a cutting tool assembly of the character described, a supporting member having a cutting bit supporting extremity, a cutting bit socket of rectangular cross-section opening from the supporting extremity of the supporting member and having right angularly related cutting bit supporting surfaces both of which are disposed obliquely angularly to the extremity plane of the supporting member, a cutting bit comprising an elongated generally rectangular bar seated in said socket and having a longitudinal edge projecting beyond the extremity of the supporting member, the face of said cutting bit bar opposite the face engaging in said socket and adjacent the rear of said edge being formed on a transverse radius throughout the length of the bit and facing generally laterally and toward said extremity, and a clamping block clampingly secured to said supporting member and having a finger profiled complementary to said radiused face and clampingly engaging said face to clamp the bit in said socket.

2. In a cutting bit for use in a cutting tool assembly of the character described, an elongated generally quadrangular metal bar, one longitudinal face of said bar being of transversely concave profile on a uniform radius throughout the length of the profile whereby to provide a longitudinal cutting edge where the profile face joins an adjacent angularly related longitudinal face of the bar, the axis of curvature of said radius being substantially parallel to said cutting edge, and an end face of the bar being relieved away from the corner of said cutting edge, the end edge running from said corner along said relieved end face at the juncture of said end face with the longitudinal face which cooperates with the profiled face and provides said cutting edge being ground off.

3. An elongated generally cylindrical, side operating boring bar, means at one end of the boring bar for supporting a cutting bit to project laterally beyond one side of the bar, only said side of the bar having a longitudinal groove therein extending from said means throughout the length of the bar, the opposite side of the bar being solid and ungrooved, said groove having the bottom formed on a rounded cross section and operating in service to prevent chatter of the bar when taking a heavy cut.

4. In combination in a cutting tool assembly, a cutter bit supporting member having a transverse groove of rectangular cross section opening laterally and endwise from the supporting member, a cutting bit bar of quadrilateral cross section having longitudinal surfaces right angularly related and seated in said groove to present an opposite longitudinal face laterally of the supporting member and the remaining longitudinal face endwise of the supporting member, the laterally facing longitudinal surface of the tool bit being formed on a smooth transverse radius groove throughout its length to provide with the endwise facing surface of the tool bit a sharp cutting edge and providing a chip curling surface inwardly from said cutting edge, and a clamping block secured to said supporting member and having a finger projecting laterally thereof into and against said radius groove surface of the tool bit and profiled complementary thereto whereby to clamp the tool bit onto its seat and hold the same against tilting from said seat during a cutting operation.

5. In combination in a side operating boring bar assembly, an elongated generally cylindrical supporting bar, a cutting tool carried by one end portion of the bar and projecting substantially laterally beyond one side of the bar, said tool having a longitudinal cutting edge extending transversely beyond said one side of the bar and projecting end-wise of the bar beyond said one end and adapted to take a heavy cut in internally boring a cylindrical wall, and said one side of the bar having a longitudinal groove therein extending from adjacent the laterally projecting portion of the cutting tool to the opposite end portion of the bar and through and beyond the area of the bar which is normally engaged by bar holder, the side of the bar opposite to said one side being of unmodified cylindrical periphery and said groove being operative to modify the vibrational characteristics of the bar to prevent chatter of the cutting tool against a workpiece while the cutting tool is taking a heavy cut.

6. In combination in a generally cylindrical side operating boring bar, means at the head end of the bar for supporting a cutting bit to project in operation from one side of the bar, the bar having a longitudinal groove in the surface of said one side only, said groove extending throughout substantially the length of the bar starting adjacent to said means and being operative to prevent chatter in the use of the bar, the side of the bar opposite to said one side being of unmodified cylindrical periphery.

7. In combination in a generally cylindrical side operating boring bar, means at the head end of the bar for supporting a cutting bit to project in operation from one side of the bar, the bar having a longitudinal groove in the surface of said one side only, said groove extending throughout substantially the length of the bar starting adjacent to said means and being operative to prevent chatter in the use of the bar, the side of the bar opposite to said one side being of unmodified cylindrical periphery, and a lamp stem mounted in said groove and having a lamp adjacent to the inner side of said cutting bit supporting means and spaced inwardly from the head end of the bar, said stem and lamp being disposed within the cylindrical circumference of the bar.

8. An elongated generally cylindrical, side operating boring bar, means at one end of the boring bar for supporting a cutting bit to project laterally beyond one side of the bar, only said side of the bar having a longitudinal groove therein extending from closely adjacent to said means toward the opposite end portion of the bar and through the area of the bar which is normally engaged by a bar holder in service, the opposite side of the bar being solid and ungrooved, said groove having the bottom formed on a rounded cross-section and operating in service to prevent chatter of the bar when taking a heavy cut, and a lamp stem lying within said groove and supporting a lamp close to said cutting bit supporting means for illumination of a surface worked upon by a cutting bit supported by said means.

References Cited in the file of this patent

UNITED STATES PATENTS

| | | |
|---|---|---|
| 191,561 | Blair | June 5, 1877 |
| 302,292 | Soderstrom | July 22, 1884 |
| 395,459 | Shields | Jan. 1, 1889 |
| 420,292 | Barrett | Jan. 28, 1890 |
| 1,040,715 | Mann | Oct. 8, 1912 |
| 1,219,097 | Gibbs | Mar. 13, 1917 |
| 2,051,954 | Leland | Aug. 25, 1936 |
| 2,109,976 | Pierce | Mar. 1, 1938 |
| 2,226,616 | Kraus | Dec. 31, 1940 |
| 2,310,166 | Way | Feb. 2, 1943 |
| 2,310,992 | Proksa | Feb. 16, 1943 |
| 2,338,073 | Behr | Dec. 28, 1943 |
| 2,380,517 | Gordon | July 31, 1945 |
| 2,391,794 | O'Brien | Dec. 25, 1945 |
| 2,400,856 | Thompson | May 21, 1946 |
| 2,426,359 | Lankheet | Aug. 26, 1947 |
| 2,485,052 | Keebler | Oct. 18, 1949 |

OTHER REFERENCES

University of Illinois Bulletin #103, vol. XV, No. 13, November 26, 1917, "An Investigation of Twist Drills," by Benedict and Lukens. Pages 39, 40 and 49 (Figures 20–22 and 29).